(12) United States Patent
Claessens et al.

(10) Patent No.: US 7,202,641 B2
(45) Date of Patent: Apr. 10, 2007

(54) DC-TO-DC CONVERTER

(75) Inventors: Johannes Matheus Theodorus Lambertus Claessens, Eindhoven (NL); Engbert Bernard Gerard Nijhof, Eindhoven (NL)

(73) Assignee: Philips Lumileds Lighting Company, LLC, San Jose, CA (US)

( * ) Notice: Subject to any disclaimer, the term of this patent is extended or adjusted under 35 U.S.C. 154(b) by 323 days.

(21) Appl. No.: 11/010,015

(22) Filed: Dec. 9, 2004

(65) Prior Publication Data

US 2005/0168199 A1 Aug. 4, 2005

(30) Foreign Application Priority Data

Dec. 12, 2003 (EP) ................... 03104664

(51) Int. Cl.
G05F 1/10 (2006.01)
G05F 1/40 (2006.01)
H02H 7/10 (2006.01)

(52) U.S. Cl. ................ 323/222; 323/282; 323/285

(58) Field of Classification Search ........... 323/222, 323/223, 229, 268, 271, 282, 285
See application file for complete search history.

(56) References Cited

U.S. PATENT DOCUMENTS 5,793,190 A * 8/1998 Sahlstrom et al. .......... 323/222
5,883,506 A * 3/1999 Masato ....................... 323/297
6,323,627 B1 * 11/2001 Schmiederer et al. ....... 323/222
6,534,961 B2 * 3/2003 Brandt ....................... 323/282
6,710,582 B2 * 3/2004 Watanabe ................... 323/222
6,933,767 B2 * 8/2005 Bucks et al. ................ 327/530

* cited by examiner

Primary Examiner—Matthew V. Nguyen
(74) Attorney, Agent, or Firm—Patent Law Group LLP; Brian D. Ogonowsky

(57) ABSTRACT

A DC-to-DC converter comprising an input inductor which is connected to an input terminal, an output inductor which is connected to an output terminal, a capacitor which is connected in series with and between the inductors, a switch element which is connected via a first resistor to a common input/output conductor and to a first node that is common to the input inductor and the capacitor, and a diode which is connected via a second resistor to the common input/output conductor and to a second node that is common to the output inductor and the capacitor, the switch element being responsive to a switch control signal (Vsw) applied thereto for alternately making the switch element conducting and non-conducting such that currents flowing through the inductors flow through the switch element or through the diode during an on-interval and an off-interval of the switch control signal (Vsw), respectively, a control circuit having at least one measurement input for receiving a current measurement voltage (Vx) across the first and second resistors, a reference input for receiving a reference signal (Vref), and an output for supplying the switch control signal (Vsw).

14 Claims, 4 Drawing Sheets

DC-TO-DC CONVERTER

FIELD OF THE INVENTION

The invention relates to a DC-to-DC converter according to the preamble of claim 1.

BACKGROUND OF THE INVENTION

A DC-to-DC converter of the above type is disclosed in U.S. Pat. No. 4,184,197 (FIGS. 5 and 5a) by Slobodan M. Ćuk. Dependent on a duty cycle of an on/off control signal supplied to a switch element, the Ćuk converter can both decrease (buck) and increase (boost) an input DC voltage to an output DC voltage. With a first input terminal and a first output terminal connected to each other, the voltages at a second input terminal and a second output terminal will have opposite polarities. Its inductors have large values, such that currents flowing through the inductors have a relatively large dc component and a much smaller triangular ripple value. Thus, the currents are not periodically falling to zero and are therefore called nonpulsating.

The Ćuk converter is unsuitable for applications which require the use of inductors of small size that control an output current of the converter. A typical example of such an application is a driver for driving a back light, in particular an array of LEDs, of a light-transmissive display panel, such as an LCD panel.

OBJECT OF THE INVENTION

It is an object of the invention to eliminate the drawbacks of the converters of the type described above and to provide a DC-to-DC converter which is capable of providing a measurement signal which represents an output current of the converter with the use of relatively simple and low-cost circuitry.

SUMMARY OF THE INVENTION

The inventors found that with a Ćuk converter a current flowing through its output inductor, if measured, accurately represents an output current of the converter and can be used for output current control. The inventors also found that control of the converter in discontinuous operation is possible by measuring currents flowing through a switch element or through a diode of the converter which switch element and diode are each connected to a respective one of the inductors and to a capacitor, which is connected in series with said inductors.

Accordingly, the above object of the invention is achieved by a DC-to-DC converter as defined in claim 1.

The converter according to the invention is able to buck and to boost an input DC voltage to an output DC voltage having opposite polarity with respect to a common voltage conductor.

The converter according to the invention allows the application of a relatively simple, low-cost control circuit for a fast and accurate control of an output current to a predetermined value.

In addition, the invention relates to and provides for a use of a DC-to-DC converter according claim 7.

BRIEF DESCRIPTION OF THE DRAWINGS

The invention will become more apparent from the following exemplary description in connection with the accompanying drawings. In the drawings.

DETAILED DESCRIPTION OF EMBODIMENTS

Figure 1:
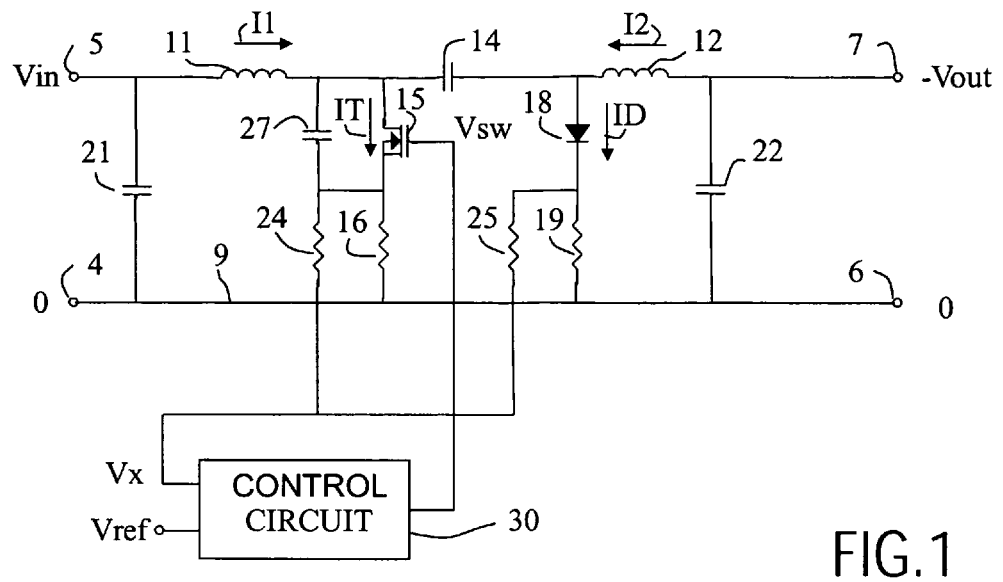
FIG. 1 is a schematic diagram of a first embodiment of a DC-to-DC converter according to the invention.

The first embodiment of the DC-to-DC converter shown in FIG. 1 comprises a first input terminal 4, a second input terminal 5, a first output terminal 6, and a second output terminal 7. Said first terminals 4 and 6 are connected to a common conductor 9. A series circuit of an input inductor 11, an output inductor 12, and a capacitor 14 between said inductors 11 and 12 is connected across the second input terminal 5 and the second output terminal 7. A power FET 15 is connected to a node of the input inductor 11 and the capacitor 14 and in series with a resistor 16 to the common conductor 9. A diode 18 is connected to a node of the output inductor 12 and the capacitor 14 and in series with a resistor 19 to the common conductor 9. Buffer or equalizing capacitors 21 and 22 are connected across the input terminals 4, 5 and the output terminals 6, 7, respectively.

Resistors 16 and 19 have small values and serve to develop a voltage across them in dependence on a current IT or ID flowing through them, respectively. The voltages developed across the resistors 16 and 19 are sensed by resistors 24 and 25, respectively. Due to high values of resistors 24, 25, the sensed voltages can be combined to provide a common measurement voltage (or measurement signal) Vx. A capacitor 27 is connected across the FET 15 to minimize switching losses.

The measurement voltage Vx is supplied to a control circuit 30, which also receives a reference voltage (or measurement signal) Vref. The control circuit 30 generates a square-wave switching voltage Vsw, which is dependent on a difference between the measurement voltage Vx and the reference voltage Vref. The switching voltage Vsw is supplied to the gate of FET 15 to therewith close a control loop. The converter is dimensioned to have its output current correspond to the reference voltage Vref, at least on average.

The circuit shown in FIG. 1 operates as follows.

Suppose that, on applying an input voltage Vin to the input terminals 4 and 5, switching voltage Vsw is made high so that the FET 15 will conduct and a voltage across the series circuit of the FET 15 and the resistor 16 will be virtually zero. A first current I1 will then flow through the input inductor 11, FET 15, and resistor 16. The first inductor 11 will cause the first current I1 to increase gradually.

Then, if switching voltage Vsw is made low, the FET 15 will no longer conduct and the first current I1 will continue to flow through the input inductor 11, the capacitor 14, the diode 18, and the resistor 19. Capacitor 14 will be charged gradually then with a positive polarity at its connecting node with the FET 15. The first current I1 will decrease accordingly.

When the FET 15 is made conducting again, the capacitor 14 will be discharged by a second current I2 which will flow through and in the direction of the FET 15, the resistor 16, the output capacitor 22, and/or a load connected to the output of the converter, and the output inductor 12. The output inductor 12 tends to maintain a current flowing through it, so that the second current I2 will increase only gradually.

Then, if the FET 15 is made non-conducting again, the second current I2 keeps on flowing, though gradually decreasing, through the output inductor 12 and through the diode 18.

In any case, the second current I2 will flow partly through a load, if any, of the converter and partly through the capacitor 22, if present, and it will develop a negative output voltage Vout at the second output terminal 7 with respect to the common conductor 9. A current flowing through a load of the converter is equal to the second current I2 on average. By measuring the second current I2, a control loop for controlling the current through the load can be established.

With the FET 15 conducting, a current IT=I1+I2 will flow through it. With the FET 15 not conducting, a current ID=I1+I2 will flow through the diode 18 instead. Measuring of these currents IT and ID with the measuring resistors 16 and 19 can provide a simple, low-cost control loop as shown in FIG. 1.

The control circuit 30 may comprise a comparator and a voltage to frequency oscillator (not shown) or a pulse width modulator (not shown) connected between the output of the comparator and the gate of the FET 15. With the comparator comparing the measurement voltage Vx and the reference voltage Vref, the switching voltage Vsw will be dependent on changes in the compared voltages. Preferably, to avoid ringing of the control loop, a delay element is included in the loop. The delay element may be provided by a simple low pass filter. However, changing of the output current of the converter in dependence on changes in a difference between said compared signals will be slowed down by such an arrangement, and this could be considered disadvantageous under certain circumstances.

Figure 2:
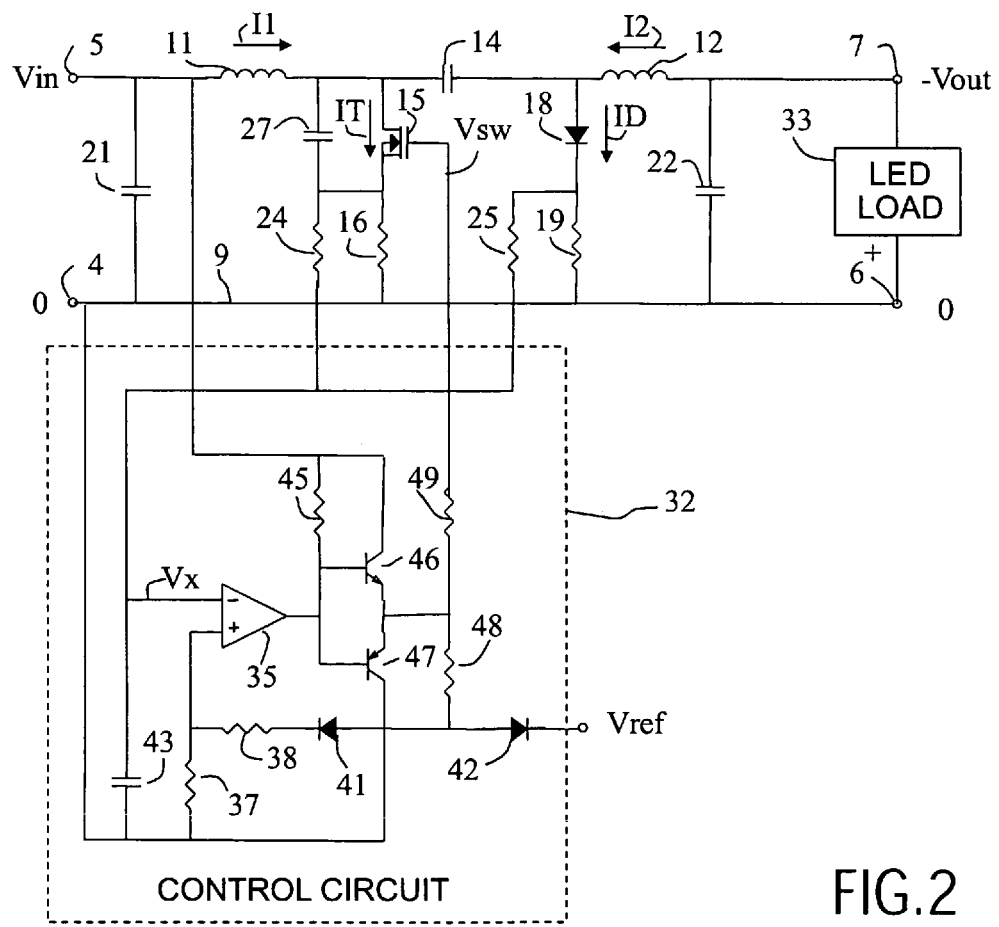
FIG. 2 is a schematic diagram of a second embodiment of a DC-to-DC converter according to the invention for critical discontinuous operation.

The second embodiment of the converter according to the invention shown in FIG. 2 comprises a basic arrangement of the control circuit 30 which shows a much faster response to changes in a difference between said compared signals.

The second embodiment shown in FIG. 2 comprises a control circuit 32 instead of control circuit 30 of FIG. 1. In addition, a LED load 33 is shown connected to the output terminals 6 and 7. Alternatively, a load such as the LED load 33 may be connected to the second input terminal 5 and second output terminal 7, with the positive terminal connected to the second input terminal 5 in the case of a LED load. With such an arrangement, a voltage across the load will be Vin+Vout. With identical voltages across a LED load in both cases, less power has to be converted in the latter case.

Control circuit 32 is a simple hysteresis controller. Control circuit 32 comprises a comparator 35. A positive input of comparator 35 is connected to the common conductor 9 via a resistor 37. Said positive input is also connected to a resistor 38, which is connected by its other terminal to a series circuit of two diodes 41, 42, of which the anodes are connected to each other and of which the cathode of a yet unterminated diode 42 is connected to an input of the control circuit 32 for receiving reference voltage Vref.

A negative input of comparator 35 is connected for receiving measurement voltage Vx. A capacitor 43 is connected to said negative input of the comparator 35 and the common conductor 9. Preferably, the value of capacitor 43 is matched with a dead time delay occurring due to the presence of capacitor 27.

With comparator 35 being of a type with open collector, its output is connected to the second input terminal 5 with potential Vin via a resistor 45. The output of comparator 35 is also connected to the base of each transistor of a series connection of an npn transistor 46 and a pnp transistor 47, of which the collectors are connected to the input terminals 5 and 4, respectively. The emitters of transistors 46, 47 are connected to the anodes of transistors 41, 42 by a resistor 48 and to the gate of FET 15 by a resistor 49 for supplying FET 15 switching voltage Vsw.

Figure 3:
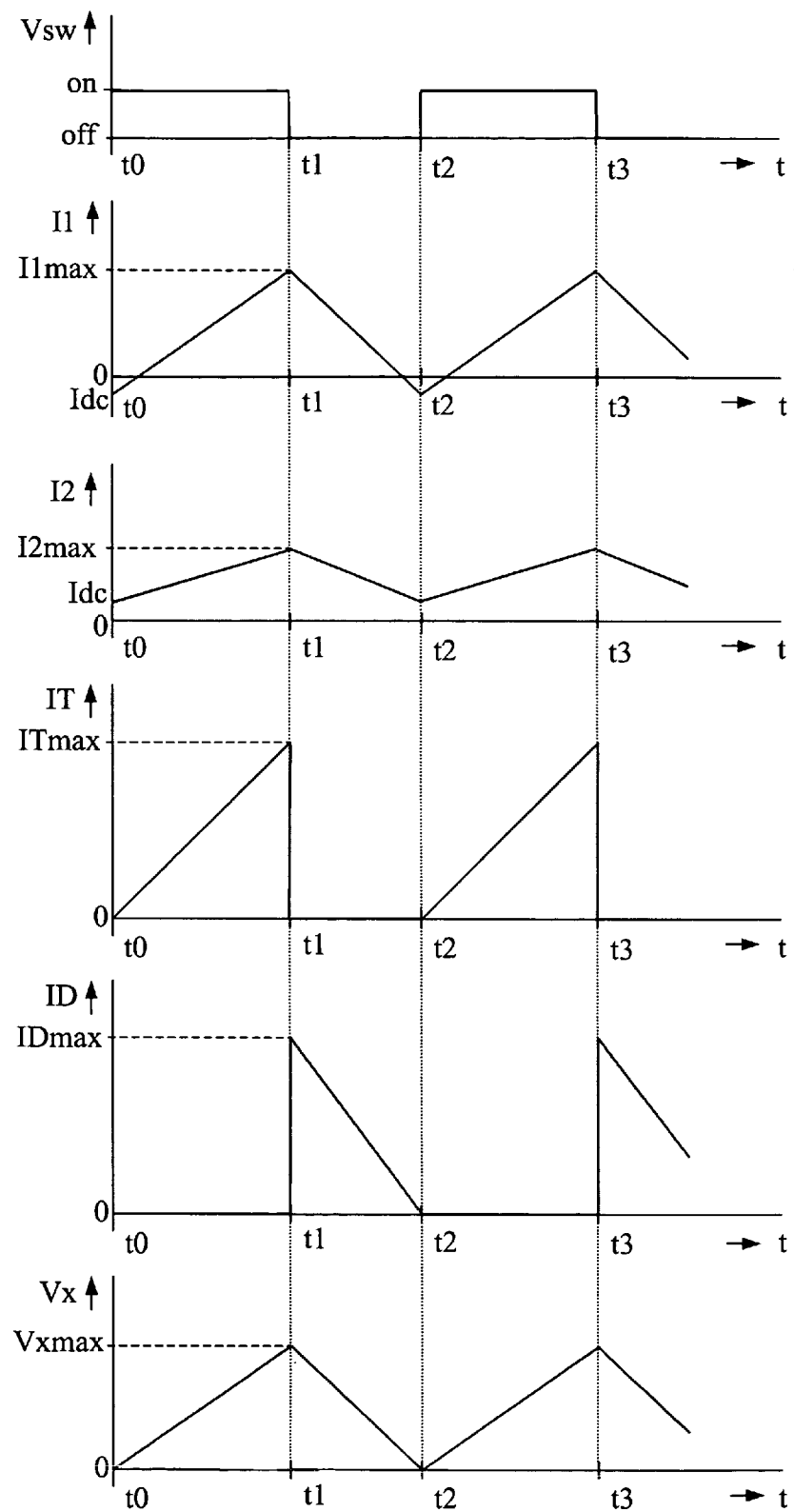
FIG. 3 is a current and voltage waveform diagram for illustrating the operation of the second embodiment shown in FIG. 2.

With reference to FIG. 3, the circuit shown in FIG. 2 operates as follows. With switching voltage Vsw being high ("on"), FET 15 will be conducting. With switching voltage Vsw being low ("off"), FET 15 will not be conducting. This is illustrated by the top diagram of FIG. 3.

At some instance t0 of the operation of the converter, when FET 15 is switched on, the current I1 flowing through input inductor 11 will have a small negative value, which is indicated by Idc in the second diagram of FIG. 3. This direct current or offset current Idc is caused by the fact that the product of the average value of the current I1 and the input voltage Vin has to be equal to the product of the average value of the current I2 through the second inductor 12 and the output voltage Vout. The second embodiment differs from the first embodiment in that the moments at which FET 15 is turned on or off are dependent on the occurrence of two different voltages which develop at the positive input of comparator 35. During the on-time of FET 15 the voltage at the positive input of comparator 35 will equal Vref, but divided by resistors 37 and 38. At a time t1, when the voltage at the negative input of comparator 35 exceeds the voltage at the positive input of comparator 35, FET 15 will be turned off, resulting in a voltage of about 0 V at the positive input of comparator 35. This also makes switching voltage Vsw low, turning FET 15 off. Then a sum of currents ID=I1+I2 will flow through diode 18 and will develop a measurement voltage Vx with decreasing value. This continues until a time t2 when the measurement voltage Vx becomes smaller than the voltage at the positive input of comparator 35. As a result, switching voltage Vsw will be made high, turning on FET 15, so that the sum of currents ID=I1+I2 will flow through FET 15 instead of through diode 18 and with increasing value. The operation of the converter with alternately turning on and off FET 15 will continue in this way.

As explained, the turning off of FET 15 will be proportional to the value of reference voltage Vref. Accordingly, maximum values I1max, I2max, ITmax, IDmax, and Vxmax of the first current I1, the second current I2, the current IT through FET 15, the current ID through diode 18, and the measurement voltage Vx, respectively, will also be proportional to a value of reference voltage Vref. As explained with reference to FIG. 1, an output current of the converter is proportional to any of said currents, in any case on average. Therefore, the output current of the converter will also be proportional to reference voltage Vref.

Figure 5:
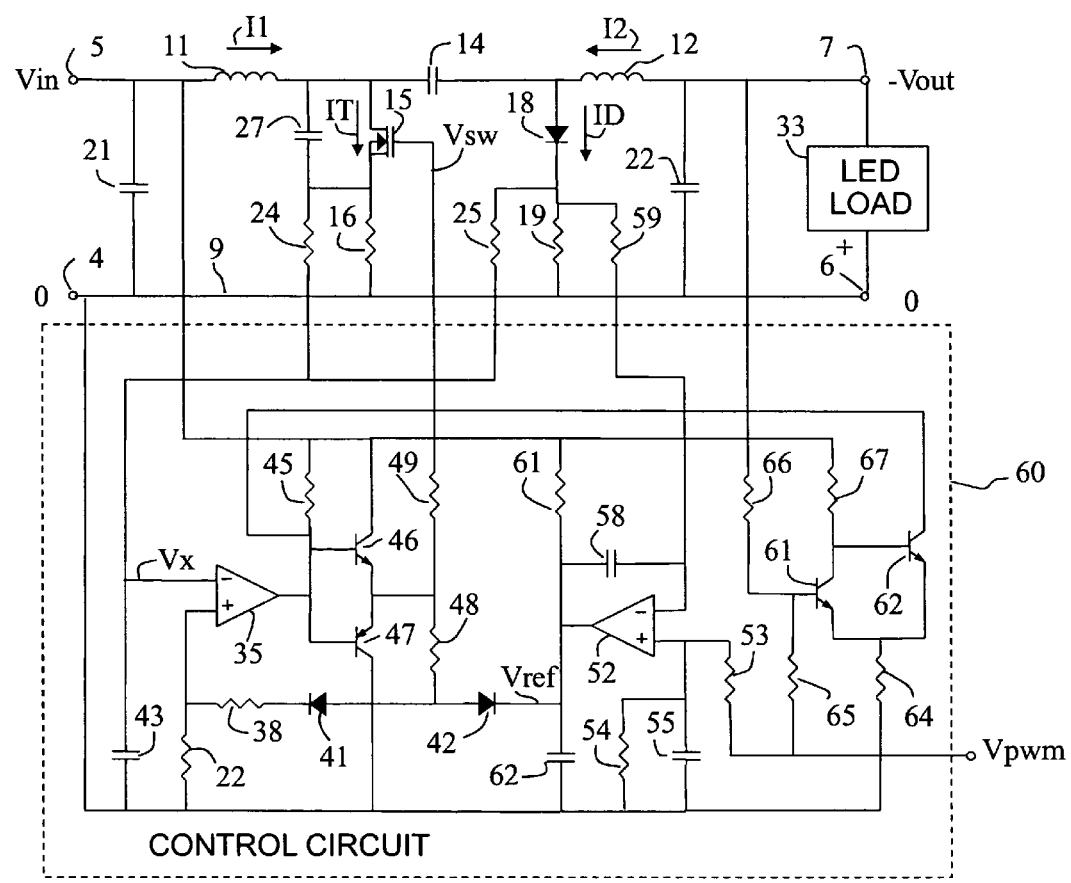
FIG. 5 is a schematic diagram of a fourth embodiment of a DC-to-DC converter according to the invention having in addition on/off and overvoltage protection characteristics compared with the third embodiment.

With the polarities as shown, since at least the first current I1 through the input inductor 11 falls to zero, even below zero, it is called pulsating, what is contrary to the Ćuk converter disclosed by U.S. Pat. No. 4,184,197 (FIGS. 5 and 5a). The pulsating waveform of at least one of the inductor currents provides two switching values for tripping comparator 35. With the circuit shown in FIG. 2 and with FET 15 being not conducting, FET 15 will conduct again very shortly after said inductor current has fallen to zero. This makes the converter operate in a so-called critical discontinuous mode. No additional clock generator is required to drive FET 15 in this mode.

Figure 4:
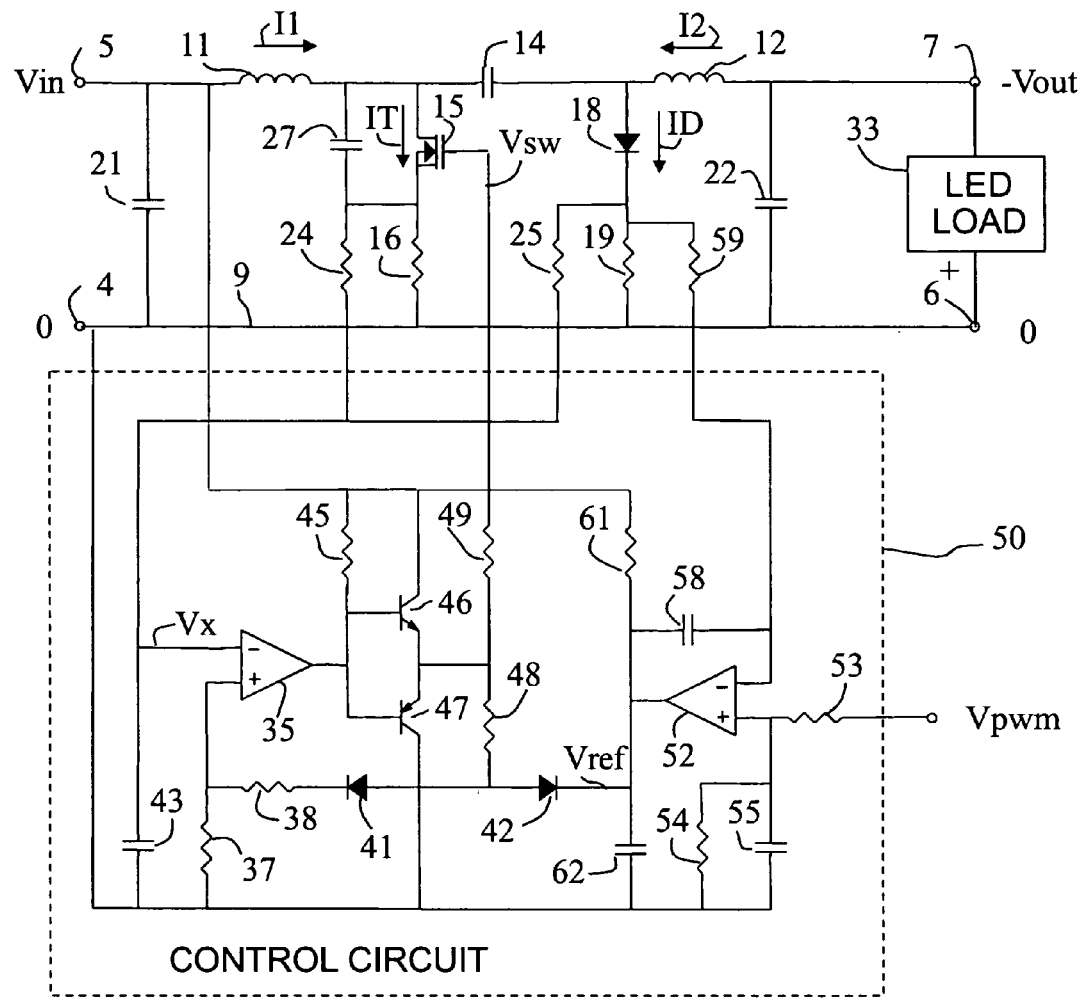
FIG. 4 is a schematic diagram of a third embodiment of a DC-to-DC converter according to the invention having in addition slow current control characteristics compared with the second embodiment.

The third embodiment of the converter according to the invention shown in FIG. 4 differs from the second embodiment shown in FIG. 2 in that the control circuit 32 is replaced by a control circuit 50. Compared with control circuit 32, control circuit 50 has been extended with a slower output current control part receiving from the outside a pulse width modulated control voltage Vpwm and supplying the reference voltage Vref to the part of the control circuit described with reference to FIGS. 1 to 3.

The additional part of control circuit 50 comprises a comparator 52. A positive input of comparator 52 receives control voltage Vpwm through a resistor 53. The positive input of comparator 52 is also connected to the common conductor 9 through a parallel circuit of a resistor 54 and a capacitor 55. A negative input of comparator 52 is connected to the output of comparator 52 through a capacitor 58. The negative input of comparator 52 is also connected to a node of diode 18 and resistor 19 through a resistor 59 to sense the current ID. Comparator 52 being of a type with an open collector, its output is connected to input terminal 5 through resistor 61. In addition, the output of comparator 52 is connected to the common conductor 9 through a capacitor 62 and to the cathode of diode 42 for supplying reference voltage Vref to the diode 42, with capacitor 62 stabilizing reference voltage Vref.

The arrangement of comparator 52 and capacitor 58 operates purely as an integrator. Since both inputs of comparator 52 receive input signals, i.e. voltage Vpwm from the outside and a measurement voltage across resistor 19, it is necessary that resistor 54 and capacitor 55 provide a time constant for the positive input of comparator 52 which is about equal to a time constant for the negative input of comparator 52. In addition, said time constant is made large in comparison with a cycle time of control voltage Vpwm.

As described with reference to FIGS. 1 to 3, an output current of the converter is proportional to a value of reference voltage Vref, at least on average. Therefore, the output current of the converter will be proportional to a modulation of control voltage Vpwm and also of its amplitude.

With the first control loop described with reference to FIGS. 1–3, the connection of the negative input of comparator 52 to diode 18 through resistor 59 closes a second control loop. The first control loop has a fast response, while the second control loop has a slower response. The second control loop is used in particular for controlling the output current of the converter on demand by external circuitry, such as digital circuitry of a computer.

The fourth embodiment of the converter according to the invention shown in FIG. 5 differs from the third embodiment shown in FIG. 4 in that control circuit 50 has been replaced by control circuit 60. Control circuit 60 differs from control circuit 50 by the addition of circuitry for protection against overvoltage and for on/off control of the converter.

Said additional circuitry of control circuit 60 comprises a Schmitt trigger circuit of two transistors 61, 62. The emitters of transistor 61, 62 are connected to the common conductor 9 through a common emitter resistor 64. The base of transistor 61 is connected to a terminal for receiving control voltage Vpwm through a resistor 65 and to the second output terminal 7 through a resistor 66. The collector of transistor 61 is connected to the second input terminal 5 through a resistor 67 and to the base of transistor 62. The collector of transistor 62 is connected to the output of comparator 35.

The negative input of comparator 52 has a maximum permitted negative voltage of −0.3 V. The Schmitt trigger circuit provides a protection of the negative input of comparator 52 against a larger negative voltage. This is made possible by the base of transistor 61 having an allowed negative voltage of −5.0 V. The use of common emitter resistor 64 provides a simple and accurate hysteresis for input voltage switching levels. The amplitude of control voltage Vpwm of, for example, 5 V is used as a reference voltage for overvoltage protection.

The voltage at the base of transistor 61 is determined by the negative output voltage Vout at output terminal 7 and control voltage Vpwm. A voltage at the base of transistor 61 at which transistor 61 is turned on and, as a consequence, transistor 62 and the converter are turned off, is called Voff here. A voltage at the base of transistor 61 at which it is turned off and, as a consequence, transistor 62 and the converter are turned on, is called Von here. Both voltages Voff and Von have two components: a first component consisting of a base-emitter voltage Vbe and a second component consisting of the input voltage Vin times a constant, which is determined by the resistors 45, 64, 67 for Voff and resistors 64 and 67 for Von. With the output voltage Vout being negative, it holds that Voff>Von (by about 0.5 V). As a consequence, the DC-to-DC converter will be disabled if the base voltage of transistor 61 becomes smaller than Von. Then, if the base voltage of transistor 61 becomes larger than Voff, the converter will be enabled. Since the base voltage of transistor 61 is dependent on values of the output voltage Vout and the amplitude of control voltage Vpwm, and with a constant value of Vpwm, the converter will be turned off for an absolute value of Vout which is a few volts higher than the value at which the converter is turned on again. Also, if control voltage Vpwm is zero for some time, the base voltage of transistor 61 will always be negative, so that the converter is surely turned off.

Accordingly, the additional circuitry of the embodiment of FIG. 5 with respect to the embodiment of FIG. 4 has a double function, i.e. turning off the converter on control by voltage Vpwm, and secondly protection against the absolute value of Vout becoming too high with respect to an amplitude of control voltage Vpwm.

A level of said overvoltage protection can be set by changing the value of resistor 66. A higher value of resistor 66 increases the overvoltage protection level. The output current of the converter can easily be set by choosing a particular value for the resistor 53. A higher value of resistor 53 reduces the output current of the converter.

As described above, the DC-to-DC converter according to the invention has several advantages over the prior art, in particular:

a very accurately controlled output current use of a simple current measurement arrangement, the output current is independent of both input and output voltage variations, the amplitude of the output current can be adjusted by changing the value of a single resistor, the overvoltage protection can be adjusted by changing the value of a single resistor.

Although reference has been made to specific embodiments of the converter according to the invention, it will be obvious that, for a skilled person, several changes and modifications can be made without departing from the scope of the converter according to the invention as claimed. For example, FET 15 could be replaced by some other switching element should this be considered appropriate under the circumstances. For the same reason a diode, such as diode

18, may be replaced by some other unidirectional element, such as a bipolar transistor which is connected as a diode.

It should also be observed that the converter can be used for driving several types of loads. LED load 33 was mentioned above as an example. Taking the LED load 33 as an example, the following values could apply: Vin=20 V, Vout=0 to 60 V, input inductor 11 100 µH, output inductor 12 1000 µH, and capacitor 14 1 µF. It will also be clear from this that the input and output inductors 11, 12 and capacitor 14 connected between both inductors have small values and therefore small sizes with respect to the original Ćuk converter. This makes the converter according to the invention very suitable for driving LED arrays for back lighting a display panel, such as of a computer.

The invention claimed is:

1. A DC-to-DC converter for converting an input dc voltage into an output dc voltage, comprising:
   a first and a second input terminal;
   a first and a second output terminal, the first input terminal and first output terminal being connected to a common conductor;
   an input inductor connected to the second input terminal;
   an output inductor connected to the second output terminal;
   a capacitor connected in series between the inductors;
   a switch element connected to the common conductor and to a first node that is common to the input inductor and the capacitor;
   a unidirectional element which is connected to the common conductor and to a second node that is common to the output inductor and the capacitor, said switch element being responsive to a switch control signal applied thereto for alternately making the switch element conducting and non-conducting such that currents flowing through the inductors flow through the switch element or through the unidirectional element during an on-interval and an off-interval of the switch control signal, respectively;
   a first current-sensing element in series with the switch element;
   a second current-sensing element in series with the unidirectional element;
   a control circuit having at least one measurement input for receiving a current measurement signal from the first and second current-sensing elements;
   a reference input for receiving a reference signal; and
   an output for supplying the switch control signal.

2. DC-to-DC converter according to claim 1, characterized in that the control circuit comprises a comparator for comparing the current measurement signal with the reference signal for providing the switch control signal in dependence on a difference between the compared signals.

3. DC-to-DC converter according to claim 2, characterized in that the control circuit comprises a delay element for delaying the current measurement signal before supplying it to the comparator.

4. DC-to-DC converter according to claim 2, characterized in that the control circuit is arranged for having the comparator compare the current measurement signal with the reference signal or with a substitute signal of about zero value during the on-interval and the off-interval of the switch control signal, respectively.

5. DC-to-DC converter according to claim 2, characterized in that the control circuit comprises a converter-enabling/disabling circuit which compares an output voltage of the converter at the second output terminal with the converter output current adjust signal and for providing an enabling/disabling signal to the comparator in dependence thereon so as to enable or to disable operation of the converter if an absolute value of the output voltage is lower than a predetermined enabling value or higher than a predetermined disabling value, respectively, with the enabling value being smaller than the disabling value.

6. DC-to-DC converter according to claim 1, characterized in that the control circuit comprises an integrator for integrating a difference between a converter output current adjust signal and a measurement signal for a current flowing through the unidirectional element for generating the reference signal.

7. DC-to-DC converter according to claim 1 further comprising a light emitting device connected to the first and second output terminals of the converter.

8. DC-to-DC converter according to claim 7 characterized in that the light emitting device is a back light of a display panel.

9. DC-to-DC converter according to claim 8 characterized in that the light emitting device comprises an array of light-emitting diodes.

10. DC-to-DC converter according to claim 7 characterized in that the light emitting device comprises one or more light-emitting diodes.

11. DC-to-DC converter according to claim 1 further comprising a light emitting device connected to the second input terminal and the second output terminal of the converter.

12. DC-to-DC converter according to claim 11, characterized in that the light emitting device is a back light of a display panel.

13. DC-to-DC converter according to claim 12, characterized in that the light emitting device comprises an array of light-emitting diodes.

14. DC-to-DC converter according to claim 11 characterized in that the light emitting device comprises one or more light-emitting diodes.

* * * * *